United States Patent [19]
Kepley, III et al.

[11] Patent Number: 5,463,678
[45] Date of Patent: Oct. 31, 1995

[54] CREDIT CARD READER

[75] Inventors: Walter R. Kepley, III, Gaithersburg; Dana J. Greer, Frederick, both of Md.; Richard A. Shields, Jr., Bellevue, Wash.

[73] Assignee: Claircom Communications Group, Inc., Seattle, Wash.

[21] Appl. No.: 40,180

[22] Filed: Mar. 26, 1993

[51] Int. Cl.⁶ .............................. H04M 11/00; G06K 7/06
[52] U.S. Cl. .................. 379/91; 235/449; 235/475; 235/482; 235/483; 379/144; 379/433
[58] Field of Search .................. 379/144, 58, 61, 379/144, 91, 433, 434; 235/449, 475, 482, 483, 486

[56] References Cited

U.S. PATENT DOCUMENTS

| | | | |
|---|---|---|---|
| 4,672,661 | 6/1987 | Clark et al. | 379/144 |
| 5,109,412 | 4/1992 | Hollowed et al. | 379/144 |
| 5,191,198 | 3/1993 | Do | 235/449 |
| 5,325,429 | 6/1994 | Kurgan | 235/483 |

FOREIGN PATENT DOCUMENTS

| | | | |
|---|---|---|---|
| 0121927 | 10/1984 | European Pat. Off. | 379/144 |
| 0276403 | 8/1988 | European Pat. Off. | 379/144 |
| 3610202 | 10/1986 | Germany | 379/144 |

*Primary Examiner*—Curtis Kuntz
*Assistant Examiner*—Stella L. Woo
*Attorney, Agent, or Firm*—Knobbe, Martens, Olson & Bear

[57] ABSTRACT

In a card reader, the transducer head is supported at one end of the guide path by a spring-loaded, pivoting arm. The spring is located adjacent the head and urges the head against the card as it passes under the head. The pivoted arm forces the head to follow a slightly arcuate path as it moves in a direction transverse to the card. With this head-support system, the guide path need only extend from approximately the pivot point of the arm to a point a short distance beyond the head and the card can be inserted laterally into the guide just behind the head. The card is read by moving the card longitudinally past the head a distance approximately equal to the length of the card so that it exits the guide just after it passes under the head.

18 Claims, 3 Drawing Sheets

CREDIT CARD READER

The disclosure of this application is related in subject matter to that of the following U.S. patent applications. Ser. No. 08/040,179 filed Mar. 26, 1993, by Kepley, III, et al. entitled "Wired Seat Back Aircraft Telephone Set"; and Ser. No. 08/040,178 filed Mar. 26, 1993, by Kepley, III, et al. entitled "Multi-Purpose Telephone Strain Relief," which are assigned to the assignee of this application. The disclosures of these applications are incorporated herein by reference.

DESCRIPTION

BACKGROUND OF THE INVENTION

1. Field of the Invention

This invention relates to an improved reader for magnetic-strip cards, particularly credit cards. More particularly, the invention relates to an improved head support to provide a compact reader installed in a telephone handset.

2. Description of the Prior Art

As will be appreciated by those skilled in the art, in a typical magnetic-strip card reader, the card is inserted into a narrow gap that guides the card as it is moved past a resiliently mounted transducing head. In order to ensure any movement of the head is perpendicular to the strip, typical prior art head-support systems extend from the headset in both directions along the guide path. Such prior art head-support systems, while generally satisfactory, usually position the head at the midpoint of the guide path. This geometry often results in a long guide path and with the leading edge of the card used upon both entering and exiting the guide path.

SUMMARY OF THE INVENTION

An object of this invention is the provision of a compact card reader, one that will fit in an airborne telephone handset.

Another object of this invention is the provision of a card reader in which the card is inserted in the guide in a direction transverse to the direction of reading motion.

Still another object of this invention is the provision of a card reader in which the longitudinal distance the card travels in a read operation approximately equals to the length of the card.

Briefly, this invention contemplates the provision of a card reader in which the transducer head is supported at one end of the guide path by a spring-loaded, pivoting arm. The spring is located adjacent the head and urges the head against the card as it passes under the head. The pivoted arm forces the head to follow a slightly arcuate path as it moves in a direction transverse to the card. With this head-support system, the guide path need only extend from approximately the pivot point of the arm to a point a short distance beyond the head and the card can be inserted laterally into the guide just behind the head. The card is read by moving the card longitudinally past the head a distance approximately equal to the length of the card so that it exits the guide just after it passes under the head.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
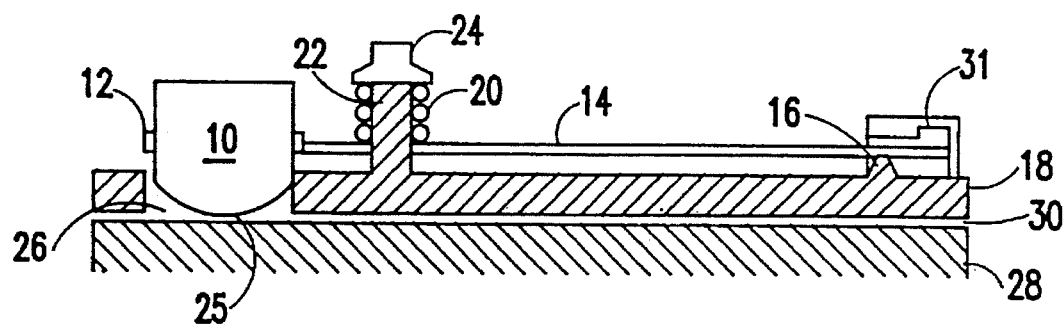
FIG. 1 is a side elevation of a head support in accordance with the teachings of this invention, with parts omitted and parts shown in section.
Figure 2:
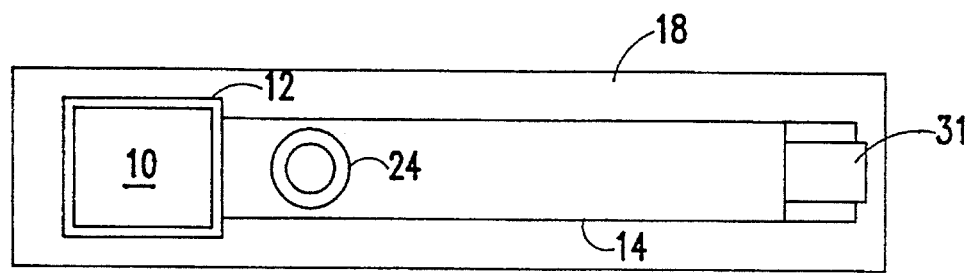
FIG. 2 is a plan view of the reader shown in FIG. 1.
Figure 3:
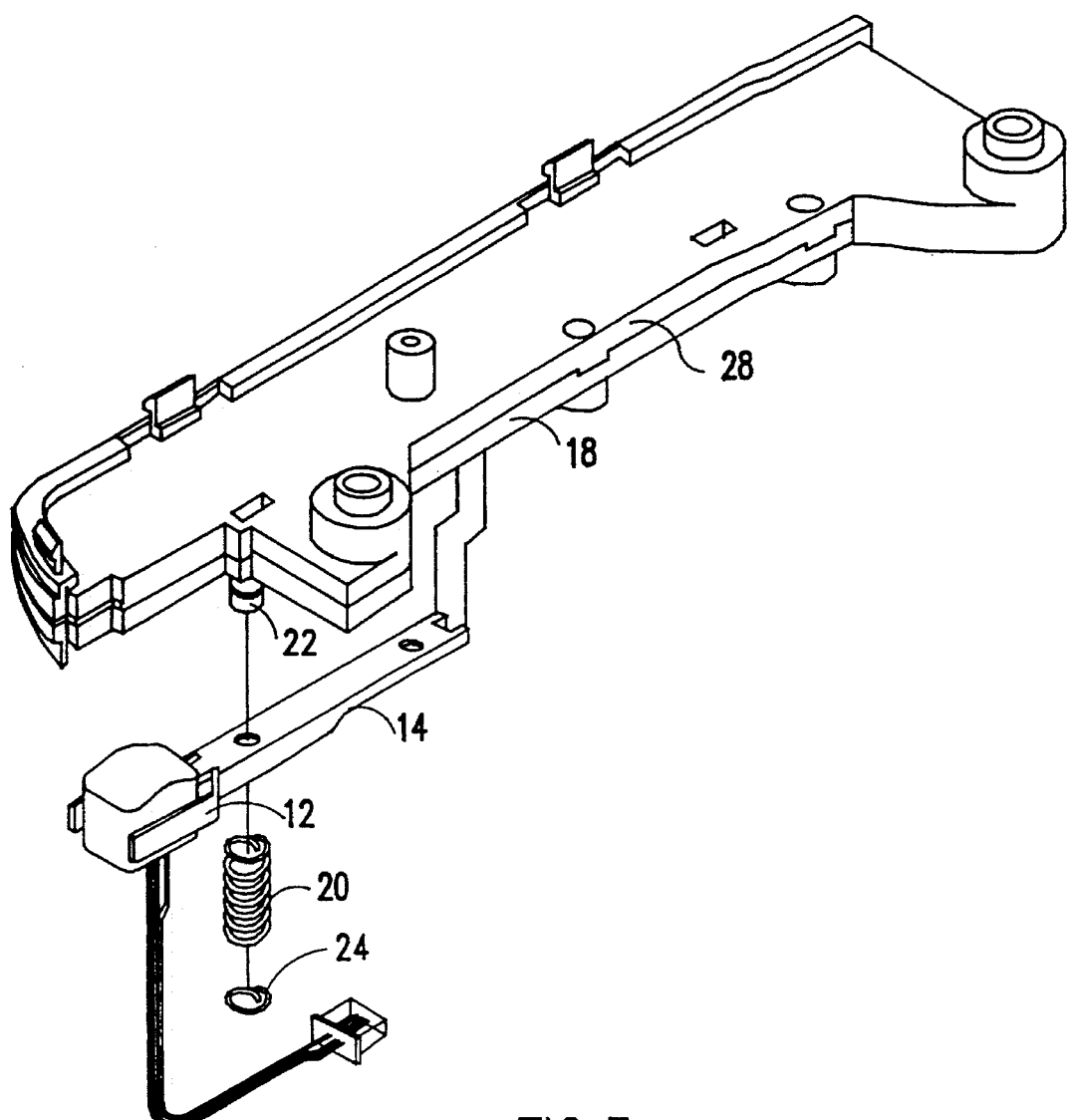
FIG. 3 is an exploded, perspective view (with parts broken away) of the reader shown in FIG. 1.

Referring now to the drawings, a magnetic strip read head 10 of a suitable prior art design, is attached by a collar 12 to one end of a beam 14. The other end of the beam rests on the rounded top surface of a post 16 that is upstanding from a base member 18. A compression spring 20 mounted on a lug 22, is disposed between the beam 14 and a retaining E-ring 24 and urges a reading surface 25 of the head 10 through an opening 26 in plate member 18 and into contact with a plate member 28. A narrow gap 30 between the plate members 18 and 28 is equal in width to approximately the thickness of the card to be read by the head 10 so that the plate member 18 and 28 form, in combination, a card guide. It will be appreciated that in operation (as viewed in FIG. 1) a card to be read is inserted laterally into the gap 30 and then moved from right to left in a card-reading operation. A wall at the back of the gap (not shown) positions the strip in the card laterally with respect to the reading transducers in the head 10. A bracket 31 guides the beam 14 on the pivot 16 while at the same time allowing limited torsional movement of the head 10 relative to a card.

In the preferred embodiment of the invention, the distance "d" from the head to the pivot post 16 is approximately equal to the length of the card to be read.

Figure 4:
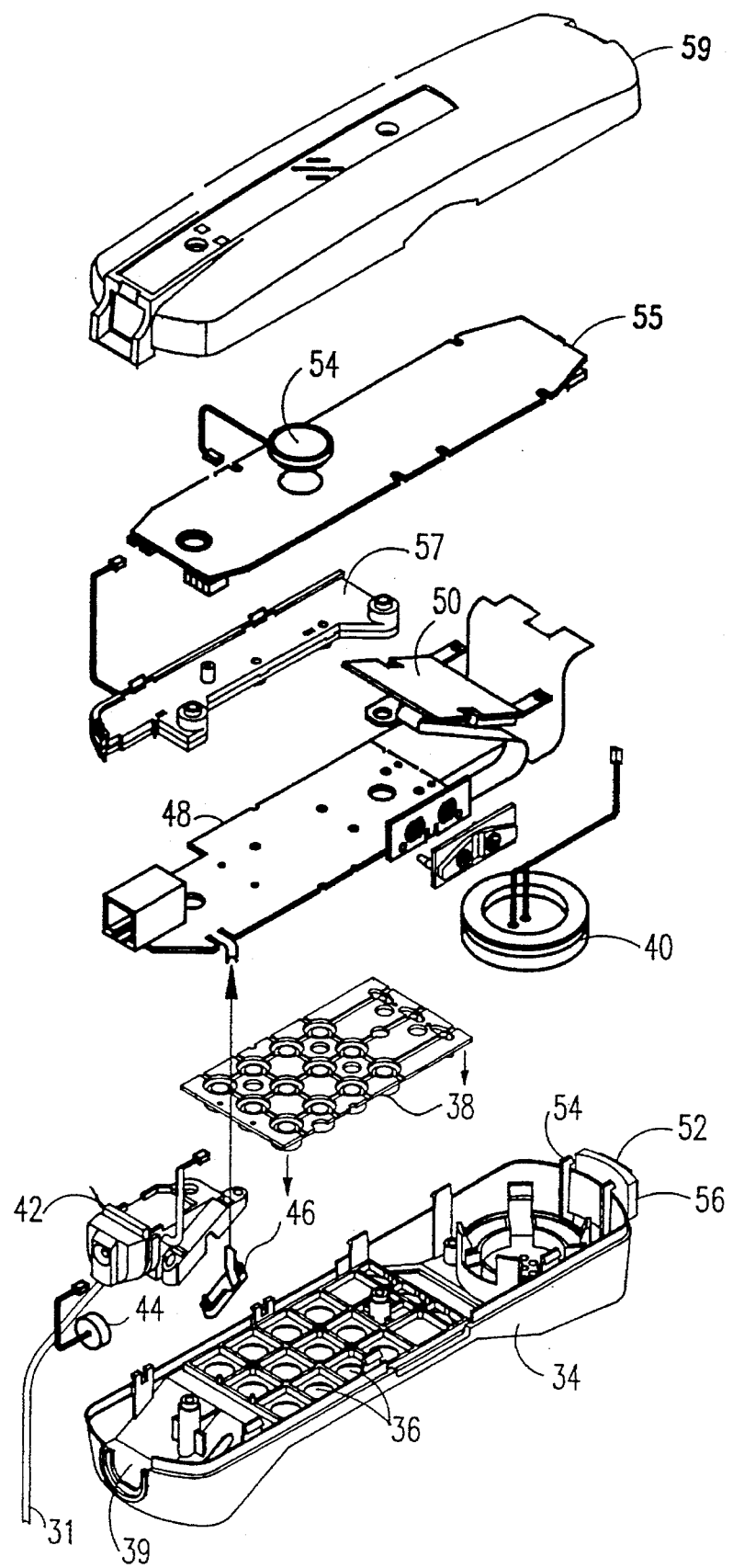
FIG. 4 is an exploded view showing components of a handset.

Referring now to FIG. 4, it shows the installation of the subassembly in a handset in accordance with a preferred embodiment of the invention. The major components of the handset comprise a front housing 34; conveniently a molded piece with openings 36 into a push-button switch, telephone key-pad array 38 fits, along with mounting brackets for the other components. An elastomeric retainer 52 fits in a bracket 54 in the handset housing. The retainer has a lip 56 that engages a tang on the ejector and prevents the handset from being ejected completely from the cradle.

The components include a receiver 40, a subassembly 42 that combines strain relief attachment for the cord, a microphone housing, and hook switch housing.

The handset further includes a key-pad module 48, an LCD display module 50, a speaker 54, a microprocessor and electronics module 55, the credit card reader 57, and a rear housing cover 56.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A magnetic strip card reader, comprising in combination:

a first guide plate with an opening therein adjacent one end of said guide plate;

a second guide plate disposed adjacent said first guide plate and separated therefrom by a gap so that said first guide plate and said second guide plate in combination form a card guide;

a head for reading a magnetic strip on a card;

means for resiliently mounting said head in said opening so that a card reading surface of said head is located in a first position adjacent said second guide plate;

said resilient mounting means including a beam with a first end of the beam secured to said head to thereby support said head and a second end of said beam engaged with said first guide plate so as to pivot about a post on said first guide plate while providing cantilevered support for said head;

said resilient mounting means further including a spring means mounted on said first guide plate adjacent said opening and engaging said beam so as to urge said second end of said beam in a direction such that said reading head is biased in said first position, so that said card can be inserted laterally into said gap and moved transversely past said head a distance approximately equal to said card's length; and a bracket positioned adjacent a second end of said first guide member to define a beam retention space between said first guide member and said bracket wherein said beam is positioned so that said second end of said beam is positioned and retained in said beam retention space and pivots about said post.

2. A magnetic strip card reader as in claim 1, wherein said spring means mounted on said first guide plate is mounted on a post formed integrally with said guide plate.

3. A magnetic strip card reader as in claim 1, further including a bracket extending over said beam in the region where said beam is pivotally supported by said post, said bracket guiding said beam while allowing torsional movement of said head.

4. The card reader of claim 1, wherein said brackets guide said beam while allowing torsional movement of said head relative said second guide plate member.

5. A telephone handset, comprising in combination:

a handset housing, said handset housing having a receiver and a microphone located on the front side of the housing;

a telephone keypad array disposed on said front of said housing between said receiver and said microphone;

a first guide plate in said housing with an opening therein adjacent one end of said guide plate;

a second guide plate in said housing disposed adjacent said first guide plate and separated therefrom by a gap accessible at a side of said housing so that said first guide plate and said second guide plate in combination form a card guide;

a head for reading a magnetic strip on a card;

means for resiliently mounting said head in said opening so that a card reading surface of said head is located in a first position adjacent said second guide plate;

said resilient mounting means including a bracket positioned adjacent a second end of said first guide member to define a beam retention space between said first guide member and said bracket and a beam with a first end of said beam secured to said head, to thereby support said head, and a second end of said beam positioned and retained in said beam retention space so that said bracket guides said beam while allowing torsional movement of said head relative said second guide member and said beam is engaged with said first guide plate so as to pivot about a post on said first guide plate while providing cantilevered support for said head;

said resilient mounting means further including a spring means mounted on said first guide plate adjacent said opening and engaging said beam so as to urge said second end of said beam in a direction so that said reading head is biased in said first position, so that said card can be inserted laterally into said gap in said side of said housing and move transversely past said head a distance approximately equal to the card's length to read said card and exit from said gap.

6. A magnetic strip card reader as in claim 5, wherein said spring means mounted on said first guide plate is mounted on a post formed integrally with said guide plate.

7. A telephone handset as in claim 5, further including a bracket extending over said beam in the region where said beam is pivotally supported by said post, said bracket guiding said beam while allowing torsional movement of said head.

8. A card reader, comprising:

a first guide plate with an opening therein;

a second guide plate positioned adjacent said first guide plate and separated therefrom by a gap so that said first guide plate and said second guide plate define in combination a card guide in said gap for receiving a card containing encoded information, said card guide being configured so that said card can be moved entirely through said card guide past said opening in said first guide plate;

a cantilevered member pivotally engaged with said first guide plate;

a head for reading said encoded information on said card, said head being positioned on the extending end of said cantilevered member so that said head is positioned in said opening in said first guide plate in a first position adjacent said second guide plate;

a biasing spring positioned on a post connected to said first guide plate and operably engaged with said cantilevered member so that said cantilevered member is urged in a direction whereby said head is biased in said first position; and a bracket positioned on said first guide plate which defines a cantilevered member retention space between said first guide member and said bracket, wherein said cantilevered member is positioned so that said end of said member opposite said head is positioned and retained in said retention space.

9. The card reader of claim 8, wherein said card is positioned between said head and said second guide plate when said card is positioned in said card guide and adjacent to said opening in said first guide plate.

10. The card reader of claim 9, wherein said biasing spring urges said cantilevered member in a direction so that said head maintains contact with a first region of said card when said card is positioned in said card guide and adjacent to said opening in said first guide plate.

11. The card reader of claim 10, wherein said head is configured to read encoded information magnetically encoded in a magnetic strip on said first region of said card.

12. The card reader of claim 11, wherein said card reader is positioned inside of a telephone handset housing.

13. The card reader of claim 8, wherein said opening in said first guide plate is positioned at substantially a first end of said first guide plate.

14. The card reader of claim 13, wherein said first guide plate includes a pivot post positioned at a second end of said first guide member substantially opposite said first end of said first guide plate.

15. A card reader, comprising:

a first guide plate with an opening therein;

a second guide plate positioned adjacent said first guide plate and separated therefrom by a gap so that said first guide plate and said second guide plate define in combination a card guide in said gap for receiving a card, said card guide being configured so that said card can be moved entirely through said card guide past said opening in said first guide plate;

a cantilevered member pivotally engaged with said first guide plate;

a head for reading said card, said head being positioned on the extending end of said cantilevered member so that said head is positioned in said opening in said first guide plate in a first position adjacent said second guide plate, wherein said cantilevered member is biased so as to urge said head into said first position; and a bracket positioned on said first guide plate which defines a cantilevered member retention space between said first guide member and said bracket, wherein said cantilevered member is positioned so that said end of said member opposite said head is positioned and retained in said retention space so that said bracket guides said beam while allowing torsional movement of said head relative said second guide plate member.

16. The card reader of claim 15, further comprising a biasing spring positioned on a post connected to said first guide plate and operably engaged with said cantilevered member so that said cantilevered member is urged in a direction whereby said head is biased in said first position.

17. The card reader of claim 15, wherein said card guide is configured so that said card can be moved entirely through said card guide past said opening in said first guide plate.

18. The card reader of claim 15, further comprising a pivot post positioned on said first guide plate at a second end of said first guide plate substantially opposite said first end of said first guide plate.

* * * * *

UNITED STATES PATENT AND TRADEMARK OFFICE
CERTIFICATE OF CORRECTION

PATENT NO. : 5,463,678
DATED : October 31, 1995
INVENTOR(S) : Kepley, lll, et. al.

It is certified that error appears in the above-indentified patent and that said Letters Patent is hereby corrected as shown below:

Column 2, line 51, change "56" to --59--.

Column 4, line 9, change "A magnetic strip card reader" to --A telephone handset--.

Signed and Sealed this

Fourth Day of June, 1996

Attest:

BRUCE LEHMAN

*Attesting Officer*     *Commissioner of Patents and Trademarks*